F. G. MERRIAM.
PIPES.
No. 6,926.
Reissued Feb. 15, 1876.
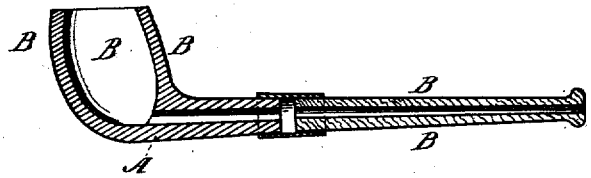
WITNESSES
E. A. Nottingham
Wm. H. Brereton Jr.
INVENTOR
Flavel G. Merriam
By Leggett & Leggett Attorneys.
N. PETERS, PHOTO-LITHOGRAPHER, WASHINGTON, D. C.

UNITED STATES PATENT OFFICE.

FLAVEL G. MERRIAM, OF AKRON, OHIO.

IMPROVEMENT IN PIPES.

Specification forming part of Letters Patent No. 169,565, dated November 2, 1875; reissue No. 6,926, dated February 15, 1876; application filed December 13, 1875.

*To all whom it may concern:*

Be it known that I, FLAVEL G. MERRIAM, of Akron, in the county of Summit and State of Ohio, have invented a new and useful Improvement in Finishing of Tobacco-Pipes made of Clay, of which the following is a specification:

This invention relates to certain improvements in the construction of tobacco-pipes; its object being to produce a cheap and durable pipe, of greater durability than the ordinary clay or composition pipe, which are objectionable not only on account of their extreme brittle character, but, in the case of pipes, because after a very little use they become saturated with the essential oil of the tobacco and the products of the destructive distillation and the condensable products of combustion of the same, which soon renders them nauseous and disagreeable to the taste, besides staining and injuring the appearance of the pipe. By my invention all these objections are obviated, and a cheap and durable pipe is produced.

My invention consists, first, in a new process of finishing pipes made of clay or other similar composition, the successive steps of which are to saturate the ordinary or composition pipe with enamel capable of withstanding a higher temperature than that to which they will ever be subjected in use, which enamel is caused by saturation and baking to enter and fill the pores of the clay or other material of which the pipes are made, rendering them impervious to nauseous or odorous substances, and giving at the same time a highly-finished and handsome appearance to the surface; second, in a pipe so manufactured, as a new article of manufacture.

The drawing represents a sectional view of my improved pipe, in which A represents the clay body or body composed of other material, and B represents the enamel covering or coating the same.

I will now proceed to describe my invention as applicable to pipes.

In carrying out my invention, I take the ordinary clay or composition pipes and coat or saturate them with an enamel capable of withstanding the heat of burning tobacco. I apply the enamel in successive applications on the outside alone of the pipe, or, more commonly, upon both the outside and the inside, until the enamel thoroughly penetrates the clay or other substances of which the pipe is composed; and it is then baked on, after each successive coat, until of sufficient thickness to impart the proper brilliancy and polish to the articles. The enamel is black, and will form a highly-ornamental black surface upon the pipe and make it similar in appearance to the expensive rubber pipes in the market, while at the same time it is free from the objectionable odor of same. Various other colors may, however, be imparted by the use of differently-colored enamel, and the pipes be made to assume the appearance of the most beautiful meerschaum, or be colored in imitation of tortoise-shell, rosewood, briarwood, and the other expensive woods commonly employed in the manufacture of pipes.

I find it most convenient to employ in the manufacture of my improved pipes the pipes in the market composed of a clay bowl and stem, or such as are composed wholly or partially of earthen material, enameling the whole, as above described.

A black enamel, which I have employed, and which is applicable in carrying out the process herein described, is prepared by boiling Naples asphaltum, fifty pounds, and dark gum anime, eight pounds, in two gallons of linseed-oil, with a sufficient quantity of any suitable drier, until wholly dissolved and the ingredients are uniformly incorporated, after which the mass is thinned down with thirty gallons of oil of turpentine. The enamel is applied to the pipe-bowls and stems of pipes by immersing the same in the enamel until the pores are completely filled, and the pipe is then baked at a high temperature. The enameled pipes are then dipped in the enamel and again baked, and the process is continued until the desired finish and polish are obtained on the surface.

In enameling pipes by this process the enamel is baked into the pipe at a temperature higher than that to which the pipe will ever be heated in use, forming an impervious filling for the pores of the said pipe, which will prevent the pores from taking up nauseous or odorous substances from the contained matter, and which will likewise be rendered tough and not liable—as glazing is—to crack or check under the action of heat or accidental causes. The pipe will leave the stem and the bowl at all times in a condition to be readily cleansed, yet giving it a high polish and beautiful finish.

What I claim is—

1. A pipe, wholly or partially composed of clay, having an external coating of baked asphaltum enamel, substantially as set forth.

2. A pipe, wholly or partially composed of clay, saturated with enamel and baked after the application of the enamel, substantially as and for the purposes set forth.

FLAVEL G. MERRIAM.

Witnesses:
WELLS W. LEGGETT,
FRANCIS TOUMEY.